United States Patent
Fukunaga et al.

(10) Patent No.: US 6,780,386 B1
(45) Date of Patent: Aug. 24, 2004

(54) CARBON MONOXIDE OXIDATION CATALYST, AND METHOD FOR PRODUCTION OF HYDROGEN-CONTAINING GAS

(75) Inventors: Tetsuya Fukunaga, Sodegaura (JP); Kozo Takatsu, Sodegaura (JP); Masatoshi Shibata, Sodegaura (JP); Satoshi Hachiya, Sodegaura (JP); Hiroyuki Endo, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/831,908

(22) PCT Filed: Nov. 24, 1999

(86) PCT No.: PCT/JP99/06535

§ 371 (c)(1),
(2), (4) Date: Jun. 19, 2001

(87) PCT Pub. No.: WO00/30745

PCT Pub. Date: Jun. 2, 2000

(30) Foreign Application Priority Data

Nov. 26, 1998 (JP) .......................................... 10-335604

(51) Int. Cl.$^7$ ................................................ C10K 1/34
(52) U.S. Cl. ..................... 423/247; 423/212; 423/246; 423/437.2
(58) Field of Search ................................ 423/247, 246, 423/212, 437.2; 502/330

(56) References Cited

U.S. PATENT DOCUMENTS

| | | | |
|---|---|---|---|
| 4,207,169 A | 6/1980 | Courty et al. | ................ 208/124 |
| 4,350,613 A | 9/1982 | Nishino et al. | |
| 4,496,780 A | 1/1985 | Arena | ......................... 568/861 |
| 6,190,430 B1 | 2/2001 | Fukuoka et al. | ........... 48/198.3 |

FOREIGN PATENT DOCUMENTS

| | | |
|---|---|---|
| EP | 0 370 757 | 5/1990 |
| EP | 0 787 679 | 8/1997 |
| JP | 4-166227 | 6/1992 |
| JP | 8-133702 | 5/1996 |
| JP | 8-295503 | 11/1996 |
| JP | 09-131531 | * 5/1997 |
| JP | 10-29804 | 2/1998 |
| JP | 10-212104 | 8/1998 |
| WO | WO 98/02377 | 1/1998 |

OTHER PUBLICATIONS

Patent Abstracts of Japan, JP 63–012346, Jan. 19, 1988.

* cited by examiner

*Primary Examiner*—Stuart L. Hendrickson
*Assistant Examiner*—Peter J Lish
(74) *Attorney, Agent, or Firm*—Oblon, Spivak, McClelland, Maier & Neustadt, P.C.

(57) ABSTRACT

Provided is a catalyst for selective oxidation of CO gas in a gas of essentially hydrogen, and a method for producing the catalyst. The catalyst is highly active in a relatively high temperature range. The catalyst is for selectively oxidizing CO gas with hydrogen, and this carries ruthenium held on a carrier of titania and alumina, or carries ruthenium with an alkali metal and/or an alkaline earth metal held thereon. For producing the catalyst, a solution containing ruthenium and an alkali metal and/or an alkaline earth metal is applied to the carrier.

1 Claim, No Drawings

CARBON MONOXIDE OXIDATION CATALYST, AND METHOD FOR PRODUCTION OF HYDROGEN-CONTAINING GAS

This application is a 371 of PCT/JP99/06535 filed on Nov. 24, 1999

TECHNICAL FIELD

The present invention relates to a catalyst for selective removal through oxidation of carbon monoxide from a gas that consists essentially of hydrogen, to a method for producing the catalyst, and to a method of using the catalyst for producing a hydrogen-containing gas through oxidative removal of carbon monoxide from a carbon monoxide-containing, hydrogen-containing gas.

BACKGROUND ART

Fuel cells for power generation do not so much pollute the environment and their energy loss is low. Other advantages are that they can be installed in any desired site, and they are easy to increase, and are easy to handle. Accordingly, fuel cells are specifically noticed these days. Various types of fuel cells are known that differ in the type of fuel and electrolyte for them and in the operating temperature. Hydrogen-oxygen fuel cells (low-temperature-working fuel cells) in which hydrogen serves as a reducing agent (active material) and oxygen (e.g., air) serves as an oxidizing agent have been developed most of all, and will be more and more popularized in future.

Various types of hydrogen-oxygen fuel cells are known that differ in the type of electrolyte and the type of electrode therein. Typical examples are phosphate-type fuel cells, KOH-type fuel cells, and solid polymer-type fuel cells. In these fuel cells, especially those capable of operating at low temperatures such as solid polymer-type fuel cells, platinum (platinum catalyst) is used for the electrodes, and it is easily poisoned with CO (carbon monoxide). Therefore, if CO of higher than a predetermined level is in the fuel for them, the power-generating capability of the fuel cells is lowered. If the CO concentration in the fuel is too high, the fuel cells could not generate power at all, and this is a serious problem.

Therefore, pure hydrogen is preferred for the fuel for these fuel cells having such a platinum-type electrode catalyst. From the practical viewpoint, however, hydrogen-containing gas is generally used for them. This is obtained through steam reforming of various types of ordinary fuels (for example, methane or natural gas (LNG); petroleum gas (LPG) such as propane, butane; various types of hydrocarbon fuels such as naphtha, gasoline, kerosene, gas oil; alcohol fuels such as methanol; town gas, and other fuels for hydrogen production), for which public supply systems have been established. Therefore, a fuel-cell power-generation system equipped with a fuel-reforming unit is now being popularized. However, the reformed gas generally contains a relatively high concentration of CO in addition to hydrogen. Accordingly, it is much desired to develop a technique for converting CO in the reformed gas into $CO_2$ that is harmless to platinum-type electrode catalysts, to thereby reduce the CO concentration in the fuel for fuel cells. For this, it is desirable that the CO concentration in the fuel is lowered generally to at most 100 ppm, preferably to at most 10 ppm.

To solve the problem as above, a technique of utilizing shift reaction of the following formula (1) (aqueous gas shift reaction) has been proposed for reducing the CO concentration in fuel gas (hydrogen-containing reformed gas) for fuel cells.

$$CO+H_2O=CO_2+H_2 \qquad (1)$$

However, reducing the CO concentration in fuel gas through only the shift reaction is limited, as the chemical equilibrium in the reaction is limited. In general, therefore, it is difficult to reduce the CO concentration in fuel gas to at most 1% through the shift reaction.

Accordingly, for further reducing the CO concentration in fuel gas, proposed is a method of introducing oxygen or an oxygen-containing gas (e.g., air) into fuel gas to thereby convert CO therein into $CO_2$. However, fuel gas contains a large amount of hydrogen. Therefore, when CO in fuel gas is oxidized, then hydrogen therein is also oxidized, and, after all, the CO concentration in fuel gas could not be satisfactorily reduced.

To solve the problem, a method of using a catalyst for selectively oxidizing only CO will be proposed in the process of introducing oxygen or an oxygen-containing gas into fuel gas so as to oxidize CO therein into $CO_2$.

For CO oxidation catalysts, heretofore known are various catalysts of Pt/alumina, Pt/$SnO_2$, Pt/C, CO/$TiO_2$, hopcalite, and Pd/alumina. However, these catalysts are not well resistant to moisture, and their reaction temperature range is low and narrow. In addition, their selectivity for CO is low. Fuel gas for fuel cells contains only a minor amount of CO in a majority of hydrogen. Therefore, if the catalysts are used for reducing the minor amount of CO in fuel gas to a lowered concentration of at most 10 ppm, a large amount of hydrogen in fuel gas must be sacrificed through oxidation.

Japanese Patent Laid-Open No. 201702/1993 discloses a method for producing a CO-free, hydrogen-containing gas for automobile fuel cells, which comprises selectively removing CO from a hydrogen-rich, CO-containing gas. The catalyst used in this is Rh or Ru held on an alumina carrier, but this is problematic in that it is applicable to only a gas having a low CO concentration.

Japanese Patent Laid-Open No. 258764/1993 discloses a method of processing a methanol-reformed gas (containing 20% by volume of CO, and from 7 to 10% by volume of CO, in addition to hydrogen) with an Fe—Cr catalyst to thereby reduce the CO concentration of the gas to 1% by volume, followed by further reducing the CO concentration of the gas through methanation with a catalyst having a catalytic metal component of Rh, Ni or Pd. In the method, CO still remaining in the processed gas is removed through plasma oxidation. The method provides a reformed gas for solid polymer-type fuel cells, and the gas does not poison the platinum catalyst for the electrode in the cells. However, as requiring a plasma generator, the method is problematic in that the reaction apparatus for it shall be large. In addition, the temperature for methanation in the method falls between 150 and 500° C. At such a high reaction temperature, not only CO but also $CO_2$ is methanated, and the methanation consumes a large amount of hydrogen in the gas. For these reasons, the method is unsuitable for CO removal from a hydrogen-containing gas for fuel cells.

Japanese Patent Laid-Open No. 131531/1997 discloses a catalyst for removing CO from a hydrogen-containing gas, and the catalyst comprises ruthenium and an alkali metal compound and/or an alkaline earth metal compound held on a titania carrier. However, this discloses nothing about a combination of titania and alumina for the carrier of the catalyst. In addition, this suggests nothing about the fact that the catalyst with a carrier of titania and alumina combined is significantly superior to the catalyst with a carrier of titania or alumina alone.

The present invention has been made in consideration of the above-mentioned viewpoints, and its object is to provide a CO oxidation catalyst which is effective for selectively oxidizing and removing CO from a hydrogen-containing gas in a broad reaction temperature range, especially even at relatively high temperatures; to provide a method for producing the catalyst; and to provide a method of using the catalyst for producing a hydrogen-containing gas, especially for producing a hydrogen-containing gas favorable to fuel cells.

DISCLOSURE OF THE INVENTION

We, the present inventors have assiduously studied, and, as a result, have found that a catalyst of ruthenium held on a carrier of titania and alumina is effective for selectively oxidizing and removing CO from a hydrogen-containing gas in a broad reaction temperature range. On the basis of this finding, we have completed the present invention.

Specifically, the invention is summarized as follows:

(1) A CO oxidation catalyst of ruthenium held on a carrier of titania and alumina.

(2) A CO oxidation catalyst of ruthenium with an alkali metal and/or an alkaline earth metal held on a carrier of titania and alumina.

(3) The CO oxidation catalyst of above (1) or (2), wherein the weight ratio of titania to alumina falls between 0.1/99.9 and 90/10.

(4) The CO oxidation catalyst of above (2) or (3), wherein the alkali metal is at least one selected from potassium, cesium, rubidium, sodium and lithium.

(5) The CO oxidation catalyst of any of above (2) to (4), wherein the alkaline earth metal is at least one selected from barium, calcium, magnesium and strontium.

(6) A method for producing a CO oxidation catalyst of ruthenium with an alkali metal and/or an alkaline earth metal held on a carrier of titania and alumina, which comprises applying a solution of ruthenium and a solution of an alkali metal and/or an alkaline earth metal to the carrier.

(7) The method for producing a CO oxidation catalyst of above (6), wherein a mixed solution of ruthenium and an alkali metal and/or an alkaline earth metal is applied to the carrier.

(8) A method for producing a CO-reduced, hydrogen-containing gas, which comprises selectively oxidizing carbon monoxide in a gas of essentially hydrogen, with oxygen in the presence of the catalyst of any of above (1) to (5) or the catalyst produced in the process of above (6) or (7).

(9) The method for producing a hydrogen-containing gas of above (8), wherein the gas of essentially hydrogen is obtained by reforming or partially oxidizing a hydrogen-producing starting material.

(10) The method for producing a hydrogen-containing gas of above (8) or (9), wherein the hydrogen-containing gas produced is for fuel cells.

BEST MODES OF CARRYING OUT THE INVENTION

Embodiments of the invention are described hereinunder.

First described are the CO-removing catalyst (CO oxidation catalyst) of the invention, which is for removing CO from a gas of essentially hydrogen, and a method for producing the catalyst.

The carrier for the catalyst of the invention is composed of titania and alumina. As held on the carrier of titania and alumina, the catalyst of the invention is superior to the catalyst of ruthenium or ruthenium and an alkali metal compound and/or an alkaline earth metal compound held on a titania carrier or an alumina carrier, which is disclosed in Japanese Patent Laid-Open No. 131531/1997, in that its activity for CO oxidation and removal is high in a broader temperature range, especially at relatively higher temperatures. In addition, as compared with the catalyst held on a titania carrier, the catalyst of the invention held on an alumina/titania carrier is easy to produce and shape, and has high mechanical strength and abrasion resistance, always keeping its high mechanical strength at any temperature at which it serves for CO oxidation.

For producing the carrier composed of titania and alumina, employable is any method capable of producing the carrier composed of the two. For example, preferred is a method of mixing titania and alumina, or a method of applying titania to shaped alumina (including alumina grains and powder). For mixing titania and alumina, for example, employed is a method of mixing titania powder with alumina powder or pseudo-boehmite alumina, along with water, then shaping the resulting mixture, drying and calcining it. For shaping it, for example, the mixture may be generally molded through extrusion. An organic binder may be added thereto for improving the moldability of the mixture. Titania may be mixed with an alumina binder to give a good carrier of titania and alumina. Water may be added to a mixed solution of a titanium alkoxide and an aluminium alkoxide dissolved in a solvent such as alcohol. In this, the alkoxides are hydrolyzed, and the co-precipitated solid is shaped, dried and calcined in the same manner as above to give a carrier of titania and alumina. Preferably, the weight ratio of titania/alumina of the carrier falls between 10/90 and 90/10.

On the other hand, titania may be adhered to shaped alumina, for example, as follows. Titania powder (this may carry a catalytic metal, and the metal-carrying titania powder will be mentioned hereinunder), and optionally an organic binder and pseudo-boehmite alumina powder are added to and well dispersed in an organic solvent. Shaped alumina is dipped in the resulting mixture (this is generally in the form of slurry). After the mixture has well penetrated into the shaped alumina and the titania powder has adhered thereto, the shaped alumina is taken out of the mixture. With that, the shaped alumina is dried and calcined. Apart from the process, a titanium alkoxide or titanium tetrachloride, and shaped alumina are added to an alcohol, to which is added water to hydrolyze the titanium alkoxide or titanium tetrachloride. Then, the shaped alumina with titanium hydroxide having deposited thereon is dried and calcined. As in the titania-adhering methods, titania may be applied to shaped alumina in any desired manner so that the shaped alumina can carry titania. In the titania/alumina carrier thus produced according to the method of adhering titania to shaped alumina, the weight ratio of titania/alumina preferably falls between 0.1/99.9 and 50/50, more preferably between 0.5/99.5 and 50/50, even more preferably between 1/99 and 50/50. In the two methods mentioned above, the weight ratio of titania/alumina of the carrier produced preferably falls between 0.1/99.9 and 90/10, more preferably between 0.5/99.5 and 90/10, even more preferably between 1/99 and 90/10.

The starting material of alumina for the method of producing the carrier may be any and every one that contains aluminium atom(s). It includes, for example, aluminium nitrate, aluminium hydroxide, aluminium alkoxides, pseudo-boehmite alumina, α-alumina, and γ-alumina. Pseudo-boehmite alumina, α-alumina and γ-alumina are obtained from aluminium nitrate, aluminium hydroxide and aluminium alkoxides. Depending on the method of producing the carrier, the starting material easy to use is selected.

The starting material of titania may also be any and every one that contains titanium atom(s). It includes, for example, titanium alkoxides, titanium tetrachloride, amorphous titania powder, anatase titania powder, and rutile titania powder. Amorphous titania powder, anatase titania powder and rutile titania powder are obtained from titanium alkoxides and titanium tetrachloride. Depending on the method of producing the carrier, the starting material easy to use is selected.

The carrier is composed of titania and alumina, but may contain any other refractory inorganic oxide. For example, it may contain zirconia and silica. The zirconia source may be any and every one that contains zirconium atom(s), for which, for example, employable are zirconium hydroxide, zirconium oxychloride, zirconium oxynitrate, zirconium tetrachloride, and zirconia powder. Zirconia powder is obtained from zirconium hydroxide, zirconium oxychloride, zirconium oxynitrate, and zirconium tetrachloride. The silica source may be any and every one that contains silicon atom(s), for which, for example, employable are silicon tetrachloride, sodium silicate, ethyl silicate, silica gel, and silica sol. Silica gel is obtained from silicon tetrachloride, sodium silicate, ethyl silicate, and silica sol.

Next described is how to apply ruthenium to the carrier.

For applying ruthenium to the carrier, for example, a ruthenium salt is first dissolved in water or ethanol to prepare a catalyst solution. The ruthenium salt includes, for example, $RuCl_3 \cdot nH_2O$, $Ru(NO_3)_3$, $Ru_2(OH)_2Cl_4 \cdot 7NH_3 \cdot 3H_2O$, $K_2(RuCl_5(H_2O))$, $(NH_4)_2(RUCl_5(H_2O))$, $K_2(RuCl_5(NO))$, $RuBr_3 \cdot nH_2O$, $Na_2RuO_4$, $Ru(NO)(NO_3)_3$, $(Ru_3O(OAc)_6(H_2O)_3)OAc \cdot nH_2O$, $K_4(Ru(CN)_6) \cdot nH_2O$, $K_2(Ru(NO_2)_4(OH)NO))$, $(Ru(NH_3)_6)Cl_3$, $(Ru(NH_3)_6)Br_3$, $(Ru(NH_3)_6)Cl_2$, $(Ru(NH_3)_6)Br_2$, $(Ru_3O_2(NH_3)_{14})Cl_6 \cdot H_2O$, $(Ru(NO)(NH_3)_5)Cl_3$, $(Ru(OH)(NO)(NH_3)_4)(NO_3)_2$, $RuCl_2(PPh_3)_3$, $RuCl_2(PPh_3)_4$, $(RuClH(PPh_3)_3) \cdot C_7H_8$, $RuH_2(PPh_3)_4$, $RuClH(CO)(PPh_3)_3$, $RuH_2(CO)(PPh_3)_3$, $(RuCl_2(cod))n$, $RU(CO)_{12}$, $Ru(acac)_3$, $(Ru(HCOO)(CO_2))n$, $Ru_2I_4(p\text{-cymene})_2$. Of these, preferred are $RuCl_3 \cdot nH_2O$, and $Ru_2(OH)_2Cl_4 \cdot 7NH_3 \cdot 3H_2O$, as easy to handle.

For applying ruthenium to the carrier, the catalyst solution as above may be applied to the carrier in any ordinary method of dipping, co-precipitation or competitive adsorption. The condition for the treatment may be suitably selected, depending on the method employed. In general, the carrier is kept in contact with the catalyst solution at a temperature falling between room temperature and 90° C., for 1 minute to 10 hours.

The amount of ruthenium to be held on the carrier is not specifically defined, but, in general, it preferably falls between 0.05 and 10% by weight, more preferably between 0.3 and 3% by weight of the carrier. If the ruthenium content is smaller than the lowermost limit, the CO conversion activity of the catalyst will be low; but if too large, the amount of ruthenium held on the carrier is excessive over the necessary amount thereof, and the cost of the catalyst thereby increases.

After ruthenium has been applied to the carrier, it is dried. For drying it, for example, employable is any known drying method of spontaneous drying, evaporation to dryness, rotary evaporation, or air drying. After having been thus dried, this is calcined generally at 350 to 550° C., preferably at 380 to 500° C., for 2 to 6 hours, preferably 2 to 4 hours.

Next described is how to apply an alkali metal and/or an alkaline earth metal to the carrier. First described is how to apply an alkali metal to the carrier. For the alkali metal, preferred are potassium, cesium, rubidium, sodium and lithium.

For applying the alkali metal to the carrier, a catalyst solution is prepared by dissolving an alkali metal salt in water or ethanol, and this is applied to the carrier. The alkali metal salt includes K salts such as $K_2B_{10}O_{16}$, $KBr$, $KBrO_3$, $KCN$, $K_2CO_3$, $KCl$, $KClO_3$, $KClO_4$, $KF$, $KHCO_3$, $KHF_2$, $KH_2PO_4$, $KH_5(PO_4)_2$, $KHSO_4$, $KI$, $KIO_3$, $KIO_4$, $K_4I_2O_9$, $KN_3$, $KNO_2$, $KNO_3$, $KOH$, $KPF_6$, $K_3PO_4$, $KSCN$, $K_2SO_3$, $K_2SO_4$, $K_2S_2O_3$, $K_2S_2O_5$, $K_2S_2O_6$, $K_2S_2O_8$, $K(CH_3COO)$; Cs salts such as $CsCl$, $CsClO_3$, $CsClO_4$, $CsHCO_3$, $CsI$, $CsNO_3$, $Cs_2SO_4$, $Cs(CH_3COO)$ $Cs_2CO_3$, $CsF$; Rb salts such as $Rb_2B_{10}O_{16}$, $RbBr$, $RbBrO_3$, $RbCl$, $RbClO_3$, $RbClO_4$, $RbI$, $RbNO_2$, $Rb_2SO_4$, $Rb(CH_3COO)$, $Rb_2CO_3$; Na salts such as $Na_2B_4O_7$, $NaB_{10}O_{16}$, $NaBr$, $NaBrO_3$, $NaCN$, $Na_2CO_3$, $NaCl$, $NaClO$, $NaClO_3$, $NaClO_4$, $NaF$, $NaHCO_3$, $NaHPO_3$, $Na_2HPO_3$, $Na_2HPO_4$, $NaH_2PO_4$, $Na_3HP_2O_6$, $Na_2H_2P_2O_7$, $NaI$, $NaIO_3$, $NaIO_4$, $NaN_3$, $NaNO_2$, $NaNO_3$, $NaOH$, $Na_2PO_3$, $Na_3PO_4$, $Na_4P_2O_7$, $Na_2S$, $NaSCN$, $Na_2SO_3$, $Na_2SO_4$, $Na_2S_2O_5$, $Na_2S_2O_6$, $Na(CH_3COO)$; and Li salts such as $LiBO_2$, $Li_2B_4O_7$, $LiBr$, $LiBrO_3$, $Li_2CO_3$, $LiCl$, $LiClO_3$, $LiClO_4$, $LiHCO_3$, $Li_2HPO_3$, $LiI$, $LiN_3$, $LiNH_4SO_4$, $LiNO_2$, $LiNO_3$, $LiOH$, $LiSCN$, $Li_2SO_4$, $Li_3VO_4$.

Described is how to apply an alkaline earth metal to the carrier. For the alkaline earth metal, preferred are barium, calcium, magnesium and strontium.

For applying the alkaline earth metal to the carrier, a catalyst solution is prepared by dissolving an alkaline earth metal salt in water or ethanol, and this is applied to the carrier. The alkaline earth metal salt includes Ba salts such as $BaBr_2$, $Ba(BrO_3)_2$, $BaCl_2$, $Ba(ClO_2)_2$, $Ba(ClO_3)_2$, $Ba(ClO_4)_2$, $BaI_2$, $Ba(N_3)_2$, $Ba(NO_2)_2$, $Ba(NO_3)_2$, $Ba(OH)_2$, $BaS$, $BaS_2O_6$, $BaS_4O_6$, $Ba(SO_3NH_2)_2$; Ca salts such as $CaBr_2$, $CaI_2$, $CaCl_2$, $Ca(ClO_3)_2$, $Ca(IO_3)_2$, $Ca(NO_2)_2$, $Ca(NO_3)_2$, $CaSO_4$, $CaS_2O^3$, $CaS_2O_6$, $Ca(SO_3NH_2)_2$, $Ca(CH_3COO)_2$, $Ca(H_2PO_4)_2$; Mg salts such as $MgBr_2$, $MgCO_3$, $MgCl_2$, $Mg(ClO_3)_2$, $MgI_2$, $Mg(IO_3)_2$, $Mg(NO_2)_2$, $Mg(NO_3)_2$, $MgSO_3$, $MgSO_4$, $MgS_2O_6$, $Mg(CH_3COO)_2$, $Mg(OH)_2$, $Mg(ClO_4)_2$; Sr salts such as $SrBr_2$, $SrCl_2$, $SrI_2$, $Sr(NO_3)_2$, $SrO$, $SrS_2O_3$, $SrS_2O_6$, $SrS_4O_6$, $Sr(CH_3COO)_2$, $Sr(OH)_2$.

For applying the alkali metal and the alkaline earth metal to the carrier, the catalyst solution as above may be applied to the carrier in any ordinary method of dipping, co-precipitation or competitive adsorption. The condition for the treatment may be suitably selected, depending on the method employed. In general, the carrier is kept in contact with the catalyst solution at a temperature falling between room temperature and 90° C., for 1 minute to 10 hours.

Ruthenium, the alkali metal and the alkaline earth metal may be applied to the carrier in any order. If possible, these may be applied to the carrier all at a time. Preferably, these are applied to the carrier all at a time. In case where these are applied to the carrier all at a time, a mixed catalyst solution containing ruthenium, an alkali metal and an alkaline earth metal is prepared, and this is applied to the carrier. The method of applying these metals to the carrier all at a time is preferred, as it is simple and the cost for catalyst production is reduced. In addition, the activity of the catalyst produced in the method is high.

Apart from the methods of applying the active metals to the carrier that has been formed previously, also employable is still another method of first applying the active metals to titania, followed by adhering the titania thus carrying the active metals to alumina to produce the catalyst of the invention. Anyhow, the method for producing the catalyst of the invention is not specifically defined, so far as the catalyst produced comprises ruthenium and other active metals held on a titania/alumina carrier.

The amount of the alkali metal and the alkaline earth metal to be held on the carrier is not specifically defined, but, in general, it preferably falls between 0.01 and 10% by weight, more preferably between 0.03 and 3% by weight of the carrier. If the metal content is smaller than the lowermost limit, the activity of the catalyst to selectively oxidize CO will be low; but if too large, the activity of the catalyst to selectively oxidize CO will lower, and, in addition, the amount of the metals held on the carrier is excessive over the necessary amount thereof, and the cost of the catalyst thereby increases.

After the alkali metal and the alkaline earth metal have been applied to the carrier, it is dried. For drying it, for example, employable is any known drying method of spontaneous drying, evaporation to dryness, rotary evaporation, or air drying. After having been thus dried, this is calcined generally at 350 to 550° C., preferably at 380 to 500° C., for 2 to 6 hours, preferably 2 to 4 hours.

The shape and the size of the catalyst thus produced are not specifically defined. The catalyst may have any desired shape and structure as in ordinary catalysts, for example, in any form of powers, spheres, granules, honeycombs, foams, fibers, cloths, plates, and rings. The method of shaping the catalyst is not specifically defined. For example, the catalyst may be molded through extrusion; or it may be adhered to honeycomb or ring substrates.

Next described is a method of using the catalyst for oxidizing carbon monoxide in a gas of essentially hydrogen, with oxygen so as to produce a CO-reduced, hydrogen-containing gas. The catalyst produced in the manner as above is generally calcined, and the active metals therein are generally in the form of their oxides. Before using it, the catalyst is reduced with hydrogen. For reducing it with hydrogen, in general, the catalyst is exposed to hydrogen streams at a temperature falling between 250 and 550° C., preferably between 300 and 530° C., for 1 to 5 hours, preferably for 1 to 2 hours.

In the presence of the thus-processed catalyst therein, oxygen is added to a hydrogen-containing gas, which consists essentially of hydrogen and which contains at least CO, to thereby selectively oxidize CO in the gas. The CO oxidation method of the invention is favorable for selective CO removal from a gas of essentially hydrogen, which is obtained by reforming or partially oxidizing a hydrogen-producing material capable of being converted into a hydrogen-containing gas by reforming or partially oxidizing it (this is hereinafter referred to as "reformed gas"), and is applied to production of a hydrogen-containing gas for fuel cells, to which, however, the invention is not limited.

The method of oxidative removal of CO from a gas of essentially hydrogen for producing a hydrogen-containing gas for fuel cells is described below.

1. Step of Reforming or Partial Oxidation of a Material for Hydrogen Production:

In the invention, CO in a reformed gas having been obtained by reforming various types of materials for hydrogen production is selectively oxidized with hydrogen in the presence of a catalyst to remove it from the gas, to thereby produce a hydrogen-containing gas of which the CO content is fully reduced. The process of reformed gas production may be any desired one that has heretofore been carried out or proposed in the art for hydrogen production, especially for that in fuel cell systems, as will be described hereinunder. Therefore, in fuel cell systems equipped with a gas-reforming unit, the reformed gas produced may be used directly in the invention as it is.

First described is how to reform or partially oxidize a material for hydrogen production. The material for hydrogen production is meant to indicate a material capable of being converted into a hydrogen-rich gas through its steam reforming or partial oxidation, and includes, for example, hydrocarbons such as methane, ethane, propane, butane; hydrocarbon-containing materials such as natural gas (LNG), naphtha, gasoline, kerosene, gas oil, fuel oil, asphalt; alcohols such as methanol, ethanol, propanol, butanol; oxygen-containing compounds such as methyl formate, methyl tert-butyl ether, dimethyl ether; and also various types of town gases, LPG, synthetic gases, and coals. The matter of selecting the material for hydrogen production herein from those depends on various related conditions such as the scale of fuel cell systems and the material supply situation. In general, preferred are methanol, methane or LNG, propane or LPG, naphtha or lower saturated hydrocarbons, and town gases.

The technique of reforming or partial oxidation (this is hereinafter referred to as "reforming technique") includes, for example, steam reforming or partial oxidation, combination of steam reforming and partial oxidation, autothermal reforming, and other reforming reactions. Of those, steam reforming is the most popular. To some specific materials, however, partial oxidation or other reforming techniques (for example, thermal reforming such as pyrolysis, and other various catalytic reforming reactions such as catalytic decomposition and shift reaction) may apply, if desired.

Also if desired, reforming reactions of different types may be combined. For example, steam reforming is generally accompanied by endothermic reaction, and it may be combined with partial oxidation that compensates for the part of endothermic reaction (the combination is autothermal reforming). As the case may be, CO having been side-produced in steam reforming may be reacted with $H_2O$ in shift reaction, so that a part of the side product, CO is converted into $CO_2$ and $H_2$ to thereby reduce the CO content of the reformed gas. In that manner, steam reforming may be combined with any type of other reactions. If desired, after having been subjected to partial oxidation in the absence of a catalyst or to catalytic partial oxidation, the processed gas may be further subjected to steam reforming in the latter stage of the process. In this case, the heat having been generated through the former-stage partial oxidation may be directly used in the latter-stage steam reforming of endothermic reaction.

Steam reforming, one typical embodiment of reforming reaction is described below.

In steam reforming, in general, the catalyst and the in reaction condition are so selected that the hydrogen absorption of the gas being processed can be as large as possible. In this, however, it is difficult to completely inhibit side production of CO. Even if steam reforming is combined with shift reaction, the CO content reduction in the reformed gas is limited. In fact, in steam reforming of hydrocarbons such as methane, it is desirable that the condition is optimized for better selectivity of the following reaction (2) or (3), to thereby increase the hydrogen yield and retard side production of CO.

$$CH_4 + 2H_2O \rightarrow 4H_2 + CO_2 \tag{2}$$

$$CnHm + 2nH_2O \rightarrow (2n+m/2)H_2 + nCO_2 \tag{3}$$

Similarly, in steam reforming of methanol, it is also desirable that the condition is optimized for better selectivity of the following reaction (4):

$$CH_3OH+H_2O \rightarrow 3H_2+CO_2 \qquad (4)$$

Further, CO may be modified and reformed according to the shift reaction of formula (1) mentioned above. However, since the shift reaction is equilibrium reaction, a relatively large amount of CO still remains in the reformed gas. Therefore, the gas reformed through the reaction (this is the gas of essentially hydrogen that shall be processed in the present invention—the same shall apply hereinunder) shall contain $CO_2$, non-reacted steam and some CO, in addition to the majority of hydrogen.

Various types of catalysts are known effective for the reforming reaction mentioned above, and a desired one is selected from these depending on the type of the starting material to be processed and the type of the reaction for reforming, and on the other reaction conditions. Some of the catalysts are mentioned below. For steam reforming of hydrocarbons and methanol, for example, Cu—ZnO catalysts, Cu—$Cr_2O_3$, catalysts, catalysts of Ni held on carrier, Cu—Ni—ZnO catalysts, Cu—Ni—MgO catalysts, and Pd—ZnO catalysts are effective. For catalytic reforming or partial oxidation of hydrocarbons, for example, catalysts of Pt, Ni or Ru held on carrier are effective.

The reforming apparatus to be employed herein is not specifically defined, and may be any and every one generally employed in ordinary fuel cell systems. However, since most reforming reactions of steam reforming or decomposition are accompanied by endothermic reaction, generally preferred are reaction units and reactors of good heat supply thereto (for example, heat-exchangeable reaction units). Such reaction units are, for example, multi-tubular reactors and plate-fin reactors. Regarding the mode of heat supply to these, for example, the reactors may be heated with a burner or a heating medium, or may be heated through catalyst combustion for partial oxidation, to which, however, the invention is not limited.

The condition for reforming reaction shall be suitably determined, as varying depending on the material to be processed, the type of reforming reaction, the catalyst used, the type of the reaction unit used, and the reaction mode in the unit. Anyhow, it is desirable that the reaction condition is so selected that the conversion of the starting material can be the largest (preferably up to 100% or nearly 100%) and that the hydrogen yield can be the largest. If desired, the non-reacted hydrocarbon and alcohol may be recovered and recycled in the reaction system. Also if desired, the formed or non-reacted CO, and water may be removed from the reaction system.

2. Step of Selective Oxidation (Conversion) and Removal of CO:

In the manner as above, obtained is a desired reformed gas which has a large hydrogen content and from which the other components of the starting material than hydrogen, such as hydrocarbons and alcohols have been fully removed.

In the invention, oxygen is added to the starting gas (reformed gas) of which the majority is hydrogen and which contains a minor amount of CO, to thereby selectively oxidize (convert) the CO therein into $CO_2$. In this, therefore, the oxidation of hydrogen must be minimized as much as possible. In addition, in this, the conversion of $CO_2$ having been formed or having existed in the starting gas into CO must be retarded (this is because the hydrogen in the starting gas may cause reverse-shift reaction). Before used for the selective oxidation, the catalyst of the invention is generally in a reduced condition. Therefore, if not, or that is, if the catalyst is not reduced, it is desirable that the catalyst is reduced with hydrogen before it is used for the selective oxidation. The catalyst of the invention produces a good result in selective oxidation and removal of CO not only from the starting gas having a low $CO_2$ content but also from any others having a high $CO_2$ content. In fuel cell systems, in general, used is a reformed gas having an ordinary-level $CO_2$ content, or that is, a reformed gas having a $CO_2$ content of from 5 to 33% by volume, but preferably a reformed gas having a $CO_2$ content of from 10 to 25% by volume, more preferably from 15 to 20% by volume.

On the other hand, the starting gas obtained through steam reforming generally contains steam, but the steam content of the starting gas to be processed in the invention is preferably as small as possible. In general, the starting gas contains from about 5 to 30% of steam, and its steam content on this level causes no problem in processing the starting gas with the catalyst of the invention.

Still another advantage of the catalyst of the invention is that not only the CO content of the starting gas having a low CO content (of at most 0.6% by volume) can be effectively reduced, but also the CO content of any others having a relatively high CO content (of from 0.6 to 2.0% by volume) can also be effectively reduced.

In the hydrogen-containing gas production method of the invention, the catalyst of the invention or the catalyst produced according to the method of the invention is used. In this method, even when the starting gas has a high $CO_2$ content of 15% by volume or more, selective conversion and removal of CO from it is still possible even at relatively high temperatures falling between 60 and 300° C. In this, the conversion and removal of CO from the starting gas is accompanied by endothermic reaction, like the side reaction, hydrogen oxidation therein. Therefore, the heat having been generated through the reaction in the method may be effectively recovered and recycled in fuel cells for increasing the power generation efficiency of the fuel cells.

In general, it is desirable that the oxygen gas to be added to the reformed gas is pure oxygen ($O_2$), air or oxygen-rich air. The amount of the oxygen gas to be added is preferably so controlled that the ratio of oxygen/CO (by mol) falls between 0.5 and 5, more preferably between 1 and 4. If the ratio is too small, the CO removal will be low; but if too large, it is unfavorable since the hydrogen consumption will increase.

The reaction pressure is not specifically defined. For fuel cells, in general, it may fall between atmospheric pressure and 10 kg/cm$^2$G, but preferably between atmospheric pressure and 5 kg/cm$_2$G. If the reaction pressure is set too high, the power for pressure elevation must be large, which, however, is uneconomical. In particular, reaction pressure higher than 10 kg/cm$^2$G is undesirable as it must be controlled according to high-pressure gas regulations, and, in addition, such high reaction pressure is not safe as being critical for the possibility of explosion.

The reaction may be effected generally at a temperature not lower than 60° C., preferably falling between 60 and 300° C. In such an extremely broad temperature range, the reaction is stable and selective for CO conversion. If the reaction temperature is lower than 60° C., the reaction speed will be low at such a low temperature, and if so, the degree of CO removal (conversion) through the reaction will be low within the practicable range of GHSV (gas hourly space velocity) for the reaction.

In general, it is preferable that the reaction is effected at GHSV falling between 5,000 and 100,000 hr$^{-1}$. GHSV indicates the hourly space velocity of the gas supplied in the reactor, based on the standard-state volume velocity of the gas supplied and passing through the catalyst layer and on the apparent volume of the catalyst layer. If GHSV is too small, a large amount of the catalyst is needed; but if too large, the CO removal will lower. Preferably, GHSV for the reaction falls between 6,000 and 60,000 hr$^{-1}$. In this step of CO conversion and removal, the CO conversion reaction is endothermic reaction, and this therefore elevates the temperature of the catalyst layer. If the temperature of the catalyst layer is elevated too much, the selectivity of the catalyst for CO conversion and removal is generally lowered. Accordingly, it is undesirable that too much CO is reacted on a small amount of the catalyst within a short period of time. To that effect, too large GHSV is often undesirable.

The reaction unit for the CO conversion and removal is not specifically defined, and may be any and every one that satisfies the above-mentioned requirements for the reaction. However, since the conversion reaction is endothermic reaction, preferred for it are reaction units or reactors that ensure easy removal of reaction heat from them for facilitating good temperature control therein. Concretely, for example, preferred are heat-exchangeable, multi-tubular or plate-fin reactors. As the case may be, a coolant medium may be circulated in or around the catalyst layer.

Of the hydrogen-containing gas thus produced according to the method of the invention, the CO content is satisfactorily reduced, as so mentioned hereinabove. Accordingly, the gas does not poison or deteriorate the platinum electrode catalyst in fuel cells, and therefore it significantly prolongs and increases the life and the power generation efficiency and capability of fuel cells. In addition, in the method of producing the hydrogen-containing gas of the invention, the heat having been generated through the CO conversion reaction can be recovered. Moreover, even a hydrogen-containing gas having a relatively high CO content can be well processed according to the method of the invention, and the CO content of the gas can be well lowered to a practicable level. In general, the CO content of the hydrogen-containing gas for fuel cells is preferably at most 100 ppm, more preferably at most 50 ppm, even more preferably at most 10 ppm. According to the method of the invention, it is surely possible to produce the hydrogen-containing gas of the preferred level, in a broad reaction condition.

The hydrogen-containing gas obtained in the invention is favorable to the fuel for various types of $H_2$-combusting fuel cells, especially for those at least having platinum (platinum catalyst) for the fuel electrode (negative electrode), for example, low-temperature-working fuel cells such as phosphate-type fuel cells, KOH-type fuel cells, and solid polymer-type fuel cells.

When an oxygen-introducing unit and a CO conversion unit both to be driven according to the method of the invention is installed in a space between the reforming unit (in case where a modifying unit is after the reforming unit, this is considered as a part of the reforming unit) and the fuel cell unit in a conventional fuel cell system; or when the catalyst of the invention is used for the CO conversion and removal catalyst in a fuel cell system equipped with an oxygen-introducing unit and a conversion reactor unit, and when the reaction condition for the CO conversion with the catalyst is controlled in the manner described hereinabove, the fuel cell system thus constructed is superior to any other conventional ones.

EXAMPLES

The invention is described more concretely with reference to the following Examples, which, however, are not intended to restrict the scope of the invention.

Example 1

160 g of rutile-type titania ($TiO_2$, Ishihara Sangyo's CR-EL, having a surface area of 7 m$^2$/g) and 59.7 g of pseudo-boehmite alumina powder (Shokubai Kasei Kogyo's Cataloid-AP) were mixed, and well kneaded with ion-exchanged water in a kneader, and the water content of the resulting mixture was controlled to be enough for extrusion. Through an extruder, this was pelletized into columnar pellets having a diameter of 2 mm and a length of from 0.5 to 1 cm, and then dried in a drier at 120° C. for 24 hours. Next, this was calcined in a furnace at 500° C. for 4 hours. This is carrier 1. The ratio by weight of titania/alumina of the carrier 1 is 80/20.

10 g of the carrier 1 was metered, to which was applied a dipping solution that had been prepared separately by adding 4.75 cc of ethanol to 5.25 cc of an ethanol solution of ruthenium chloride (containing 0.952 g of Ru in 50 cc). This was heated at 60° C. to evaporate and remove ethanol, and calcined in a muffle furnace at 120° C. for 2 hours and then at 500° C. for 4 hours. This is ruthenium-carrying carrier 1.

Next, 10 cc of an aqueous solution containing 0.0259 g of potassium nitrate, which had been prepared separately, was applied to the ruthenium-carrying carrier 1. This was heated at 60° C. to evaporate and remove water, and calcined in a muffle furnace at 120° C. for 2 hours and then at 500° C. for 4 hours. This is catalyst 1. The composition of the catalyst 1 is shown in Table 1. The crash strength of the catalyst 1 is 1.2 kg/mm, and this proves the durability of the catalyst 1 in use in ordinary conditions.

Example 2

Carrier 2 having a ratio by weight of titania/alumina of 50/50, ruthenium-carrying carrier 2 and catalyst 2 were produced in the same manner as in Example 1, for which, however, used were 100 g of rutile-type titania (this is the same as in Example 1) and 149 g of pseudo-boehmite alumina powder (this is the same as in Example 1) in place of 160 g of rutile-type titania and 59.7 g of pseudo-boehmite alumina powder. The composition of the catalyst 2 is shown in Table 1.

Example 3

14.2 g of titanium tetraisopropoxide (TTIP, Wako Pure Chemical Industries' special-grade chemical) was dissolved in 97 ml of isopropyl alcohol, to which was added 5.25 g of diethanolamine, and stirred for 2 hours. Next, a solution of 3.6 ml of isopropyl alcohol in 1.8 g of water was gradually added to it, and then stirred for 2 hours. 25 ml of the resulting solution was metered, to which was added 10 g of activated alumina (Sumitomo Chemical's KHD24) that had been dressed to be 16 to 32-mesh grains. This was left as it was for 1 hour, and the alumina grains were taken out through filtration, and well washed with isopropyl alcohol. The grains were calcined in a muffle furnace at 120° C. for 2 hours and then at 500° C. for 4 hours. This is carrier 3. The carrier 3 has titania adhering onto the solid grains of alumina (alumina grains). The ratio by weight of titania/alumina of the carrier 3 is 1/99.

10 g of the carrier 3 was metered, to which was applied a dipping solution that had been prepared separately by adding 4.75 cc of ethanol to 5.25 cc of an ethanol solution of ruthenium chloride (containing 0.952 g of Ru in 50 cc). This was heated at 60° C. to evaporate and remove ethanol, and calcined in a muffle furnace at 120° C. for 2 hours and then at 500° C. for 4 hours. This is ruthenium-carrying carrier 3.

Next, 10 cc of an aqueous solution containing 0.0259 g of potassium nitrate, which had been prepared separately, was applied to the ruthenium-carrying carrier 3. This was heated at 60° C. to evaporate and remove water, and calcined in a muffle furnace at 120° C. for 2 hours and then at 500° C. for 4 hours. This is catalyst 3. The composition of the catalyst 3 is shown in Table 1.

Example 4

3 g of activated alumina (Sumitomo Chemical's KHD24) that had been dressed to be 16 to 32-mesh grains was dipped in a titania dispersion of 0.8 g of rutile-type titania ($TiO_2$, Ishihara Sangyo's CR-EL, having a surface area of 7 $m^2/g$) and 0.3 g of pseudo-boehmite alumina powder (Shokubai Kasei Kogyo's Cataloid-AP) in 2 ml of a dispersion medium (ion-exchanged water/polyoxyethylene(10) octylphenyl ether (from Wako Pure Chemical Industries)/acetylacetone= 50/1/1 by volume), to thereby make titania adhere onto the alumina grains. The alumina grains were taken out through filtration, washed and dried. The grains were calcined in a muffle furnace at 120° C. for 2 hours and then at 500° C. for 4 hours. This is carrier 4. The carrier 4 has titania adhering onto the solid grains of alumina (alumina grains). The ratio by weight of titania/alumina of the carrier 4 is 15/85.

3.84 g of the carrier 4 was metered, and dipped in 2 ml of an ethanol solution of ruthenium chloride that had been prepared separately (the solution contains 38.4 mg of Ru). This was heated at 60° C. to evaporate and remove ethanol, and calcined in a muffle furnace at 120° C. for 2 hours and then at 500° C. for 4 hours. This is ruthenium-carrying carrier 4.

Next, the ruthenium-carrying carrier 4 was dipped in 5 ml of an aqueous solution of potassium nitrate that had been prepared separately (this contains 3.0 mg of K). With that, this was heated at 60° C. to evaporate and remove water, and calcined in a muffle furnace at 120° C. for 2 hours and then at 500° C. for 4 hours. This is catalyst 4. The composition of the catalyst 4 is shown in Table 1.

Example 5

Catalyst 5 of this Example is the ruthenium-carrying carrier 1 produced in Example 1. Its composition is shown in Table 1.

Comparative Example 1

10 g of rutile-type titania ($TiO_2$, Ishihara Sangyo's CR-EL, having a surface area of 7 $m^2/g$) was dipped in 5.25 cc of an ethanol solution of ruthenium chloride that had been prepared separately (this contains 0.952 g of Ru in 50 cc). This was heated at 60° C. to evaporate and remove ethanol, and calcined in a muffle furnace at 120° C. for 2 hours and then at 500° C. for 4 hours. This is catalyst 6 (powdery catalyst). Its carrier is titania alone. The composition of the catalyst 6 is shown in Table 1. Before Ru was applied thereto, pelletizing the starting titania into columnar pellets was tried through extrusion in the same manner as in Example 1, but in vain.

Comparative Example 2

10 g of the catalyst 6 produced in Comparative Example 1 was metered, to which was applied a dipping solution that had been prepared separately by dissolving 0.0259 g of potassium nitrate in 5.25 ml of ion-exchanged water. This was heated at 60° C. to evaporate and remove water, and calcined in a muffle furnace at 120° C. for 2 hours and then at 500° C. for 4 hours. This is catalyst 7 (powdery catalyst). Its carrier is titania alone. The composition of the catalyst 7 is shown in Table 1.

Comparative Example 3

A dipping solution that had been prepared separately by adding 4.75 cc of ethanol to 5.25 cc of an ethanol solution of ruthenium chloride (containing 0.952 g of Ru in 50 cc) was applied to 10 g of activated alumina (Sumitomo Chemical's KHD24) that had been dressed to be 16 to 32-mesh grains. This was heated at 60° C. to evaporate and remove ethanol, and calcined in a muffle furnace at 120° C. for 2 hours and then at 500° C. for 4 hours. This is catalyst 8. Its carrier is alumina alone. The composition of the catalyst 8 is shown in Table 1.

Comparative Example 4

To 10 g of the catalyst 8 produced in Comparative Example 3, applied was a dipping solution that had been prepared separately by dissolving 0.0259 g of potassium nitrate in 10 ml of ion-exchanged water. This was heated at 60° C. to evaporate and remove water, and calcined in a muffle furnace at 120° C. for 2 hours and then at 500° C. for 4 hours. This is catalyst 9. Its carrier is alumina alone. The composition of the catalyst 9 is shown in Table 1.

Example 6

10 g of the carrier 1 produced according to the process of Example 1 was metered, and dipped in a dipping solution that had been prepared separately by dissolving 0.263 g of ruthenium chloride (containing 38.03% of ruthenium metal) and 0.026 g of potassium nitrate. This was dried at 60° C., and then calcined in air at 500° C. for 4 hours. This is catalyst 10. Its composition is shown in Table 1.

Example 7

10 g of the carrier 1 produced according to the process of Example 1 was metered, and sprayed with 2.0 cc of a dipping solution (this is the same as in Example 6), with stirring under reduced pressure. This was dried at 120° C., and then calcined at 500° C. for 4 hours. This is catalyst 11. Its composition is shown in Table 1.

Example 8

0.263 g of ruthenium chloride (containing 38.03% of ruthenium metal) and 0.026 g of potassium nitrate were dissolved in 5.5 cc of water to prepare a dipping solution. 10 g of the carrier 3 produced according to the process of Example 3 was metered, and sprayed with the dipping solution, with stirring under reduced pressure. This was dried at 120° C., and then calcined at 500° C. for 4 hours. This is catalyst 12. Its composition is shown in Table 1.

Example 9

Ruthenium and potassium were applied to the carrier 1 produced according to the process of Example 1, in the manner mentioned below.

0.263 g of ruthenium chloride (containing 38.03% of ruthenium metal) was dissolved in 2.0 cc of water to prepare a dipping solution. 10 g of the carrier 1 was metered, dipped in the dipping solution, then dried at 60° C., and thereafter calcined in air at 500° C. for 4 hours. This is ruthenium-carrying carrier 5.

0.026 g of potassium nitrate was dissolved in 2.0 cc of water to prepare a dipping solution. The ruthenium-carrying carrier 5 was dipped in the dipping solution, and then dried at 60° C. This was calcined in air at 500° C. for 4 hours. This is catalyst 13. Its composition is shown in Table 1.

Example 10

0.263 g of ruthenium chloride (containing 38.03% of ruthenium metal) was dissolved in 2.0 cc of water to prepare a dipping solution. 10 g of the carrier 1 was metered, and sprayed with the dipping solution with stirring under reduced pressure. This was dried at 120° C., and then calcined in air at 500° C. for 4 hours. This is ruthenium-carrying carrier 6.

0.026 g of potassium nitrate was dissolved in 2.0 cc of water to prepare a dipping solution. The ruthenium-carrying carrier 6 was sprayed with the dipping solution with stirring under reduced pressure, and then dried at 120° C. This was calcined in air at 500° C. for 4 hours. This is catalyst 14. Its composition is shown in Table 1.

Example 11, Comparative Example 5
Selective Oxidation of CO Gas:

Before in use, each catalyst was dressed to be 16 to 32-mesh grains. Concretely, the catalysts 1, 2, 5, 10, 11, 13 and 14 each were ground, while the catalysts 6 and 7 each were shaped into tablets, using a tablet-shaping machine, and then ground; and each catalyst powder was dressed to be 16 to 32-mesh grains. The other catalysts were in the form of 16 to 32-mesh grains, and they were used as they were. The catalyst was packed into a fixed bed flow reactor, and hydrogen gas passed through it to reduce the catalyst at 500° C. for 1 hour.

A gas of essentially hydrogen was processed in the reactor for selective oxidation of CO therein, under the condition shown in Table 2. The reaction temperature was varied in a range within which the CO concentration in the processed gas was reduced to at most 10 ppm. The results are given in Table 3. As in this, the catalyst activity was evaluated on the basis of the temperature range within which the CO concentration in the processed gas was reduced to at most 10 ppm.

TABLE 1

Titania/Alumina Ratio in Carrier of Catalyst, and Amount of Metal Held by the Carrier

| Catalyst | $TiO_2/Al_2O_3$ (by weight) | Ruthenium (wt. %) | Potassium (wt. %) | Method of Catalyst Production |
|---|---|---|---|---|
| Catalyst 1 | 80/20 | 1.0 | 0.1 | Example 1 |
| Catalyst 2 | 50/50 | 1.0 | 0.1 | Example 2 |
| Catalyst 3 | 1/99 | 1.0 | 0.1 | Example 3 |
| Catalyst 4 | 15/85 | 1.0 | 0.1 | Example 4 |
| Catalyst 5 | 80/20 | 1.0 | 0.0 | Example 5 |
| Catalyst 6 | 100/0 | 1.0 | 0.0 | Co. Ex. 1 |
| Catalyst 7 | 100/0 | 1.0 | 0.1 | Co. Ex. 2 |
| Catalyst 8 | 0/100 | 1.0 | 0.0 | Co. Ex. 3 |
| Catalyst 9 | 0/100 | 1.0 | 0.1 | Co. Ex. 4 |
| Catalyst 10 | 80/20 | 1.0 | 0.1 | Example 6 |
| Catalyst 11 | 80/20 | 1.0 | 0.1 | Example 7 |
| Catalyst 12 | 1/99 | 1.0 | 0.1 | Example 8 |
| Catalyst 13 | 80/20 | 1.0 | 0.1 | Example 9 |
| Catalyst 14 | 80/20 | 1.0 | 0.1 | Example 10 |

TABLE 2

CO Oxidation Condition

| Items | Reaction Condition |
|---|---|
| Reaction Pressure | atmospheric pressure |
| Reaction Temperature | 50 to 350° C. |
| Gas Hourly Space Velocity (GHSV) | 10,000 hr$^{-1}$ |

TABLE 2-continued

CO Oxidation Condition

| Composition of Gas Processed | (vol. %) |
|---|---|
| Hydrogen | 74.4 |
| Carbon Monoxide | 0.6 |
| Carbon Dioxide | 15 |
| Oxygen | 2 |
| Nitrogen | 8 |

TABLE 3

Result of CO Oxidation

| | Catalyst | Reaction Temperature Range (° C.)* |
|---|---|---|
| Example 11 | Catalyst 1 | 90–300 |
| | Catalyst 2 | 100–300 |
| | Catalyst 3 | 85–300 |
| | Catalyst 4 | 110–270 |
| | Catalyst 5 | 85–280 |
| | Catalyst 10 | 70–300 |
| | Catalyst 11 | 60–300 |
| | Catalyst 12 | 75–300 |
| | Catalyst 13 | 80–270 |
| | Catalyst 14 | 75–270 |
| Comp. Example 5 | Catalyst 6 | 50–250 |
| | Catalyst 7 | 95–200 |
| | Catalyst 8 | 110–250 |
| | Catalyst 9 | 90–250 |

*This is the reaction temperature range (° C.) within which the CO concentration in the processed gas was reduced to at most 10 ppm.

The catalysts carrying the same metal are compared in point of the high-activity temperature range for selective CO oxidation. As in Table 3, the catalysts with the active metal on a carrier of titania and alumina combined (catalysts 1 to 5, and catalysts 10 and 14) are active in a broader temperature range than the catalysts with the active metal on a carrier of titania or alumina alone (catalysts 6 to 9). In particular, the former catalysts are active at high temperatures. Regarding their shapability including the mechanical strength of the shaped catalysts, the catalysts with the active metal held on a carrier of titania and alumina combined are superior to those with the active metal held on a carrier of titania alone.

INDUSTRIAL APPLICABILITY

The catalyst of the invention is effective for selective conversion and removal of CO from a gas of essentially hydrogen within a broad temperature range. When used in hydrogen-oxygen fuel cells, the catalyst prevents the platinum electrode (hydrogen electrode) from being poisoned by CO, and therefore prolongs the cell life and stabilizes the cells for power generation.

What is claimed is:

1. A method for producing a CO-reduced, hydrogen-containing gas, which comprises selectively oxidizing carbon monoxide in a gas of essentially hydrogen with oxigen in the presence of a CO oxidation catalyst comprising ruthenium with an alkali and/or an alkaline earth metal held on a carrier of titania and alumina, wherein the weight ratio of titania to alumina falls between 20/80 and 80/20, and the amount of ruthenium falls between 0.3 and 3% by weight of the carrier.

* * * * *